United States Patent [19]

Nose et al.

[11] 3,861,011

[45] Jan. 21, 1975

[54] MILLING CUTTER

[75] Inventors: Shunzo Nose, Itami; Shigetada Yoneyama, Nagoya, both of Japan

[73] Assignee: Sumitomo Electric Industries, Ltd., Osaka, Japan

[22] Filed: Aug. 27, 1973

[21] Appl. No.: 391,832

[30] Foreign Application Priority Data

Sept. 1, 1972    Japan.......................... 47-101442[U]

[52] U.S. Cl................. 29/105 R, 29/103 A, 29/106
[51] Int. Cl.............................................. B26d 1/12
[58] Field of Search............... 29/103 A, 105 R, 106

[56] References Cited

UNITED STATES PATENTS

| | | | |
|---|---|---|---|
| 2,207,909 | 7/1940 | Besaw | 29/105 R |
| 2,237,901 | 4/1941 | Chun | 29/103 A |
| 3,037,264 | 6/1962 | Mossberg | 29/103 A |

Primary Examiner—Leonidas Vlachos
Attorney, Agent, or Firm—Kurt Kelman

[57] ABSTRACT

In an inserted blade milling cutter, cemented carbide herical inserts are placed within a plurality of grooves formed around the cutter body and removably secured to the body by means of suitable clamping means.

1 Claim, 5 Drawing Figures

MILLING CUTTER

BACKGROUND OF THE INVENTION

The present invention relates generally to an improvement of an inserted blade milling cutter and, more particularly, to an inserted blade milling cutter improved to have one or more herical inserts removably secured to the body so as to effectively remove chips free of the cutter. This kind of milling cutter is recently introduced on the market presumably promising a high tool efficiency and a wide applicability, but in practice it seems that some improvements are necessary before realizing its expectant performance.

Since the heretofore used inserted blade milling cutter has no means for forcibly remove chips, such cutter has disadvantages such that a pocket for chips is readily filled with chips during cutting operation, so limiting operating conditions (e.g. feed rate and milling depth) rather below the general level. This fact seems very important. Common milling cutter with helical peripheral teeth is, of course, formed in one body, so it is easy to provide a wider chip pocket just front of each tooth. But in case of inserted blade milling cutter, inevitably some clamping devices are necessary which are for example clamping wedge, clamping screw and recessed groove for blade and so on, so the compacting these clamping parts between teeth or blade is resulting in narrowing the chip pocket far narrower than that of one-bodied milling cutter. Essentially, some technics which allow high chip removal rate even though narrower chip pocket is needed for this newly developed milling cutter. Another point for improvements is that, since means for adjusting the cutting edge of the insert is not provided, the heretofore used inserted blade milling cutter has also such a disadvantage that run out of the end cutting edge of the cutter is not satisfactorily eliminated. Moreover, the inserted blade must withstand against axial cutting force not to move backwardly, nevertheless its length is shortening through the sequence of regrindings. Thus certain adjustable means for positive backing-up of blade is feasible for blade inserted milling cutter.

SUMMARY OF THE INVENTION

Accordingly, the first object of the present invention is to improve the construction of the inserted blade milling cutter so that the chips filled in the pocket can be forced out of the cutter body.

The second object of the present invention is to provide an inserted blade milling cutter wherein run out of the end cutting edge of the cutter inserts can be easily eliminated, and at the same time the cutter inserts are adjustably and positively supported against axial replacement.

The first object of the present invention can be achieved by providing chip removing means comprising a plurality of fluid outlet ports opening at the pocket portion of the cutter body.

The second object of the present invention can be achieved by providing cutting edge adjusting means comprising an adjust screw disposed at the rear end of the spiral groove which accepts the helical blade, and engageable with the rear end of the insert.

BRIEF DESCRIPTION OF THE DRAWINGS

These and other objects and features of this invention will be better understood upon consideration of the following detailed description and the accompanying drawings in which.

PREFERRED EMBODIMENT OF THE INVENTION

A preferred embodiment of the present invention will now be described with reference to the accompanying drawings. While the inserted blade milling cutter according to the present invention is applicable to cutting tools such as end mills, shell end mills and face mills, only the application of the present invention for end mills will be described in the ensuing description for the sake of simplification.

Figure 1:
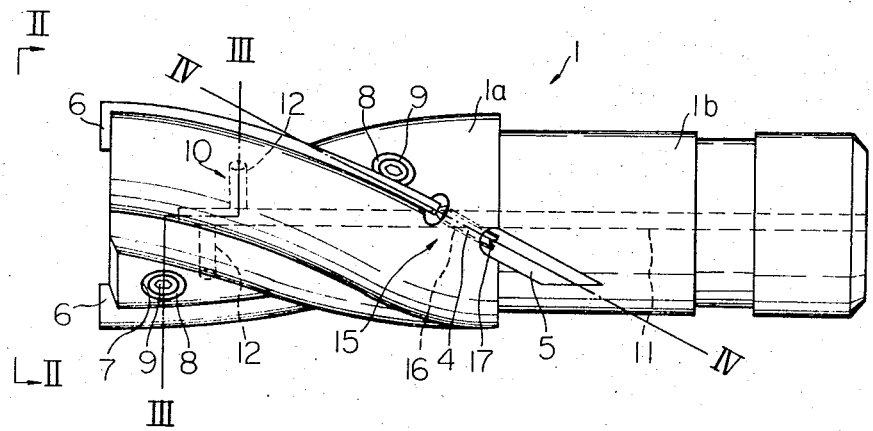
FIG. 1 is a side view of an end milling cutter which is an embodiment of the milling cutter according to the present invention.
Figure 2:
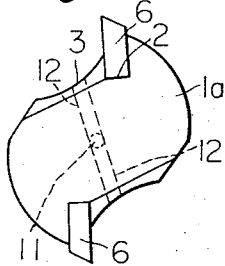
FIG. 2 is an end view of the end milling cutter viewed from the arrows II—II of FIG. 1.
Figure 3:
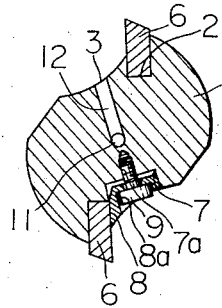
FIG. 3 is a sectional view taken along the line III—III of FIG. 1.
Figure 4:
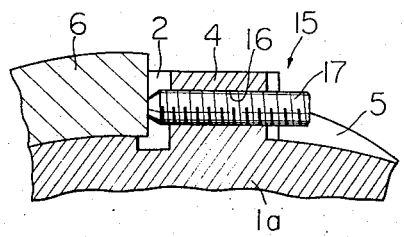
FIG. 4 is a fragmentary enlarged view taken along the line IV—IV of FIG. 1; and, FIG. 5 is a graph showing the cutting capacity of the end milling cutter of FIG. 1.

FIG. 1 generally shows an inserted blade milling cutter or an inserted blade end mill 1 according to the present invention. The end mill 1 has a body 1a to which a blade or an insert is mounted and a shank 1b formed integrally with the body 1a. On the outer peripheral surface of the body 1a there are provided spiral grooves 2 extending axially opposing diametrically to each other and twisted circumferentially and a pocket 3 for chips adjacent the grooves and extending along them. An end of each of the spiral grooves 2 opens at a lower end face (the leftmost end face in FIG. 1) of the body 1a while the other end thereof terminates allowing a marginal portion 4 on the upper and outer portion of the body 1a. On a side of the margin 4 opposite to the spiral grooves there is provided a groove 5 extending in the same direction with the spiral grooves as far as the shank 1b. Within the spiral grooves 2 there are inserted cemented carbide inserts 6 which are twisted in the same curvature as the spiral grooves.

In the pocket 3 of the body 1a, there are provided a plurality of sinkings 7 adjacent the spiral grooves 2 and within said sinkings there is inserted a clamp 8 which engages the insert to secure it on the body 1a. The clamp 8 is tightened against the body and the insert, by means of a set screw 9 screwed into a threaded hole 7a of the body through a counter-sinking 8a at the center of the clamp 8. Thus, the insert is fixed to the body in the spiral groove 2.

On the central axis of the body and shank there are provided a fluid supplying hole 11 of chip removing means 10 extending axially and opening at the rear end (the rightmost end in FIG. 1) of the shank, and one or more fluid outlet ports 12 (one in each pocket in the illustrated embodiment) extending radially outward from said channel 11 and opening at each pocket.

In the margin 4 in the rear of the body 1a, there is provided a threaded hole 16 for cutting edge adjusting means 15 passing through between the spiral grooves 2 and the groove 5, and within said threaded hole 16 there is screwed an adjust screw 17. Since the end of the adjust screw 17 engages the rear end of the insert 6, the insert can be moved outward along the spiral groove 2 by turning the adjust screw 17.

In cutting operation using the inserted blade milling cutter or the inserted blade end mill according to the present invention, a pressurized fluid such as compressed air is supplied into the fluid supplying hole or channel 11 from the rear end of the shank letting the pressurized fluid blow off from the fluid outlet port 12 during cutting operation. Thus, the chips accumulatingly received in the space between the work piece and the pocket 3 of the end mill 1 during the cutting operation are forced out free of the cutter by the pressurized fluid blown off from the fluid outlet port without filling up the pocket.

From the foregoing, it will be apparent that the inserted blade milling cutter according to the present invention is capable of forcibly and effectively removing chips free of the cutter body by blowing off the pressurized fluid such as compressed air and, accordingly, it has the advantages such that it can be used in heavier cutting and that it can precisely adjust the cutting edge since it has the cutting edge adjusting means.

Figure 5:
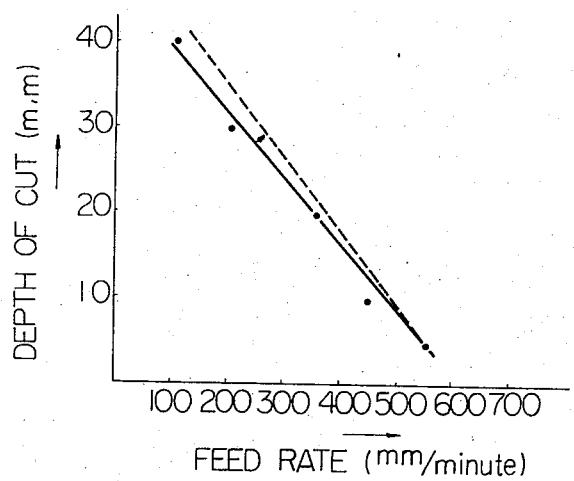

In FIG. 5, the results of a cutting capacity test using an inserted blade end mill according to the present invention are shown by the points. In the graph of FIG. 5, the solid line indicates the proved upper limit cutting conditions of the end mill which is an embodiment of the milling cutter according to the present invention.

Cutting conditions employed in this test were as following.

| | |
|---|---|
| Tooth diameter of the end mill: | 35 mm |
| Number of the cutting blades: | 2 |
| Type of milling: | key way milling without cutting fluid |
| Number of rotation: | 453 r.p.m. (approx. 50 m/min) |
| Work materials: | a plain carbon steel equivalent to AISI 1050 |
| Tool material: | cemented carbide |

What is claimed is:

1. A milling cutter comprising a body having a plurality of spiral grooves formed around the body; a plurality of inserts removably secured within said spiral grooves; cutting chip removing means for forcibly removing chips filling up a pocket, said chips removing means including a channel extending axially through the central part of said body and opening at the rear of said body and at least one fluid outlet port extending radially outwardly from said channel and opening at the pocket; and cutting edge adjusting means having an adjusting screw screwed into a marginal portion at the rear end of the spiral groove, an end of said screw being engageable with the rear end of said insert.

* * * * *